(12) United States Patent
Strandborg et al.

(10) Patent No.: US 12,505,766 B1
(45) Date of Patent: Dec. 23, 2025

(54) VIEW-EXTENDED MULTISCOPIC RENDERING

(71) Applicant: Distance Technologies Oy, Helsinki (FI)

(72) Inventors: Mikko Strandborg, Hangonkylä (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/313,229

(22) Filed: Aug. 28, 2025

Related U.S. Application Data

(63) Continuation-in-part of application No. 19/186,827, filed on Apr. 23, 2025, now Pat. No. 12,432,332.

(51) Int. Cl.
*G06F 3/01* (2006.01)
*G02B 30/27* (2020.01)
*G09G 3/00* (2006.01)

(52) U.S. Cl.
CPC ............ *G09G 3/003* (2013.01); *G02B 30/27* (2020.01); *G06F 3/013* (2013.01); *G09G 2320/0209* (2013.01); *G09G 2320/0247* (2013.01); *G09G 2320/0257* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 5,712,732 A | * | 1/1998 | Street | H04N 13/373 348/E13.058 |
| 2024/0385436 A1 | * | 11/2024 | Dehkordi | G06F 3/012 |

* cited by examiner

*Primary Examiner* — Duane N Taylor, Jr.
(74) *Attorney, Agent, or Firm* — Ziegler IP Law Group, LLC.

(57) ABSTRACT

A multiscopic display includes an array of light-emitting cells and a multiscopic optical element including a plurality of multiscopic cells. For a given multiscopic cell, distinct sets of light-emitting cells whose emitted light is directed toward respective eyes of at least one user are identified, and at least one additional set of light-emitting cells that does not emit light directed toward any of the eyes, is separated by a distance smaller than a first predefined threshold from a single distinct set of light-emitting cells, and is separated by a distance greater than a second predefined threshold from other distinct sets of light-emitting cells is determined. Pixel values are retrieved corresponding to the distinct sets and the at least one additional set from images to be presented to the respective eyes, and are used to generate an output image for display via the multiscopic display.

14 Claims, 4 Drawing Sheets

VIEW-EXTENDED MULTISCOPIC RENDERING

CROSS-REFERENCE TO RELATED APPLICATIONS

This application is a continuation-in-part of U.S. patent application Ser. No. 19/186,827, titled "AUTOSTEREOSCOPIC DISPLAY WITH IMPROVED LENTICULAR RESOLUTION" filed on Apr. 23, 2025, which is incorporated herein by reference.

TECHNICAL FIELD

The present disclosure relates to multiscopic displays; and more particularly, to systems for extending a view of a multiscopic rendering. The present disclosure also relates to methods for extending a view of a multiscopic rendering.

BACKGROUND

Multiscopic displays direct light emitted from different regions of an array of light-emitting cells toward different viewing directions, so that different eyes of a user perceive different images. For a given multiscopic cell, only a narrow region of the array is effectively visible to a given eye at a given eye position. For example, in a lenticular array, when an effective thickness of a lenticular lens in a given viewing direction matches a focal length of the lenticular lens, a corresponding focus spot on the array becomes very small, so that only a few light-emitting cells contribute to a perceived image through that lenticular lens. While this optical behaviour provides angular selectivity, it also makes the perceived image highly sensitive to small changes in the user's eye position. Even slight motion of the user's head can shift which underlying cells direct light toward the given eye, leading to perceptible dimming, flicker, or momentary loss of image.

Eye tracking is commonly used to direct appropriate image content toward the eyes of the user. However, latency and residual uncertainty in tracking mean that a multiscopic rendering pipeline may target an eye position that does not exactly match the instantaneous eye position. As a result, image degradation can occur even when the user is relatively still. In practical terms, this can manifest as temporary brightness loss, contrast reduction, or instability in the perceived image as the focus spot shifts across the array of light-emitting cells between updates.

Another issue is utilization efficiency of the array. At any particular time instant, many light-emitting cells lie outside regions that direct light toward either eye and, therefore, remain unutilised. Such an under-utilization can exacerbate the dimness associated with very small focus spots, because relatively few light-emitting cells actively contribute to each eye's view at any time instant.

In addition, multiscopic displays must manage crosstalk, namely unwanted light intended for one viewing direction reaching another. To mitigate crosstalk, mappings between eyes and emission regions are constrained, with margins maintained between such regions. However, such margins further narrow effective emission regions, increasing sensitivity to head motion and the likelihood of transient brightness loss at boundaries between the emission regions. These effects are especially pronounced when the effective focus spot is small.

The abovementioned challenges are not confined to a single optical architecture. They arise in lenticular arrays, integral imaging lenslet arrays, parallax barriers and other multiscopic optical elements that partition the array into directional emission regions. At oblique viewing angles, the periodic nature of multiscopic optical elements means that visible regions can repeat across pitches, complicating boundary behaviour as the user's head moves. Collectively, the combination of narrow effective emission regions, head-tracking uncertainty, sudden head motion, crosstalk management, and instantaneous under-utilization of the array presents persistent obstacles to stable brightness and robust image quality in multiscopic displays.

For completeness, static lenticular prints demonstrate that image content can be distributed across many underlying regions to address multiple viewing directions. However, such prints are static and provide stereoscopic effects only from fixed viewing positions, offering no remedy for eye position changes during live viewing or for the dynamic stability issues encountered in multiscopic displays.

Accordingly, the foregoing issues remain challenges for achieving stable, high-quality multiscopic imaging.

SUMMARY

The present disclosure seeks to provide a system and method for extending a view of a multiscopic rendering to improve stability of perceived brightness and image quality in multiscopic displays under conditions of head motion and tracking uncertainty. The aim of the present disclosure is achieved by a multiscopic display system and method that identify distinct sets of light-emitting cells for respective eyes of at least one user and determine additional sets of light-emitting cells based on predefined thresholds, for utilisation during multiscopic display, as defined in the appended independent claims to which reference is made. Advantageous features, including uncertainty-adaptive thresholds, reprojection to anticipated positions, luminance adjustment, and dominant-eye selection, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1B depicts a zoomed-in part of a cross-section of a multiscopic display, while

DETAILED DESCRIPTION OF EMBODIMENTS

Figure 1A:
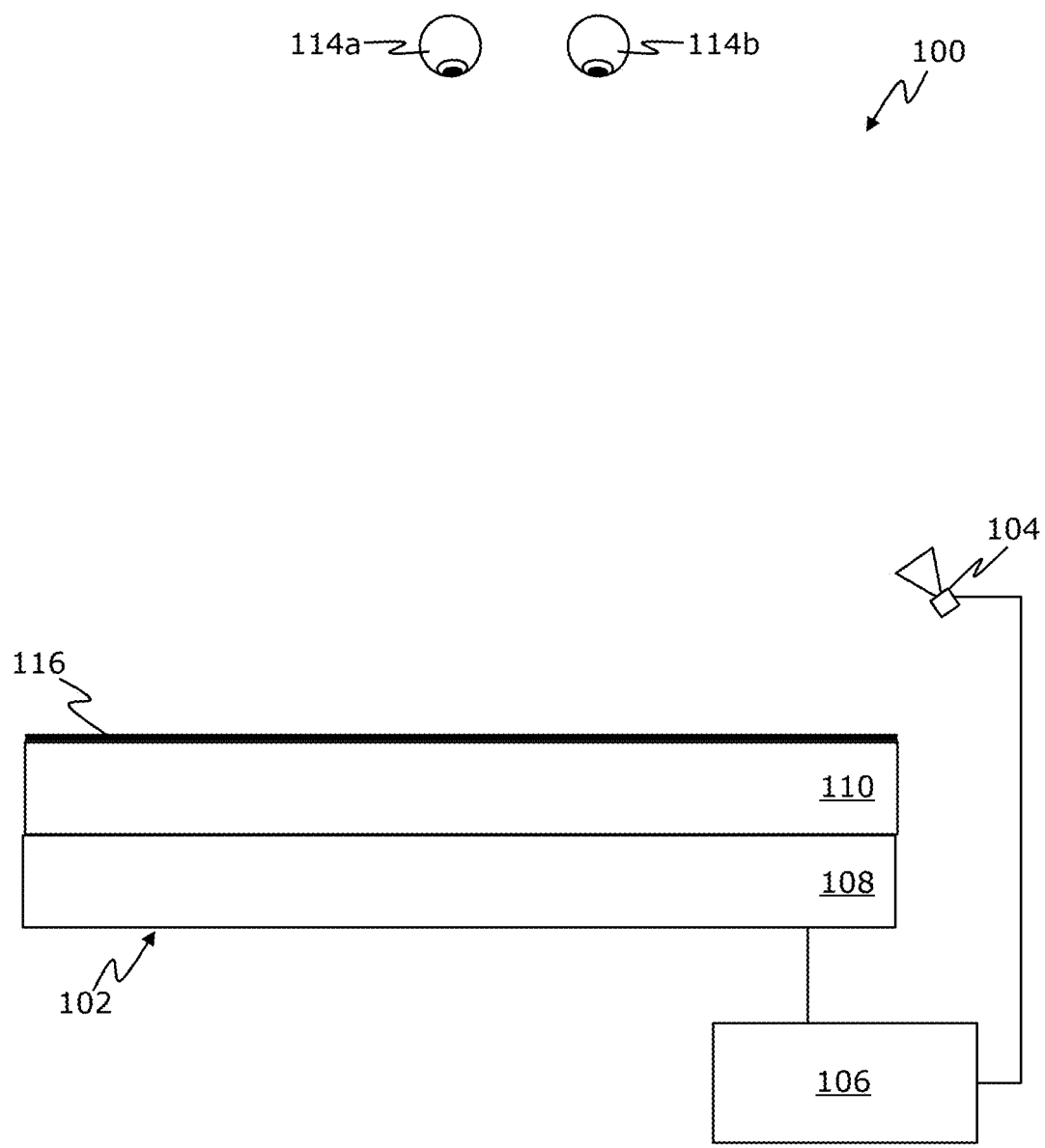
FIG. 1A is a schematic illustration of a system for extending a view of a multiscopic rendering, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
an eye tracker;
a multiscopic display comprising:
an array of light-emitting cells; and
a multiscopic optical element comprising a plurality of multiscopic cells; and
at least one processor configured to:
determine respective relative positions of eyes of at least one user with respect to an image plane of the multiscopic display, using the eye tracker;
for a given multiscopic cell, identify a plurality of distinct sets of light-emitting cells whose emitted light is directed toward respective ones of the eyes of the at least one user, based on the respective relative positions of the eyes with respect to the image plane, and a position of the given multiscopic cell in the multiscopic optical element;
for the given multiscopic cell, determine at least one additional set of light-emitting cells that:
(i) does not emit light that is directed toward any of the eyes of the at least one user,
(ii) is separated by a distance smaller than a first predefined threshold from a single distinct set of light-emitting cells, and
(iii) is separated by a distance greater than a second predefined threshold from any other distinct set of light-emitting cells;
generate or retrieve respective images to be presented to the eyes of the at least one user, based on the respective relative positions of the eyes with respect to the image plane;
retrieve pixel values, from each of the respective images, corresponding to a respective one of the plurality of distinct sets;
identify a given eye corresponding to the single distinct set;
retrieve pixel values, from an image to be presented to the given eye, corresponding to the at least one additional set;
generate an output image using pixel values retrieved for the plurality of distinct sets and the pixel values retrieved for the at least one additional set; and
display the output image via the multiscopic display.

In a second aspect, an embodiment of the present disclosure provides a method comprising:
determining respective relative positions of eyes of at least one user with respect to an image plane of a multiscopic display, using an eye tracker, wherein the multiscopic display comprises an array of light-emitting cells and a multiscopic optical element comprising a plurality of multiscopic cells;
for a given multiscopic cell, identifying a plurality of distinct sets of light-emitting cells whose emitted light is directed toward respective ones of the eyes of the at least one user, based on the respective relative positions of the eyes with respect to the image plane, and a position of the given multiscopic cell in the multiscopic optical element;
for the given multiscopic cell, determining at least one additional set of light-emitting cells that:
(i) does not emit light that is directed toward any of the eyes of the at least one user,
(ii) is separated by a distance smaller than a first predefined threshold from a single distinct set of light-emitting cells, and
(iii) is separated by a distance greater than a second predefined threshold from any other distinct set of light-emitting cells;
generating or retrieving respective images to be presented to the eyes of the at least one user, based on the respective relative positions of the eyes with respect to the image plane;
retrieving pixel values, from each of the respective images, corresponding to a respective one of the plurality of distinct sets;
identifying a given eye corresponding to the single distinct set;
retrieving pixel values, from an image to be presented to the given eye, corresponding to the at least one additional set;
generating an output image using pixel values retrieved for the plurality of distinct sets and the pixel values retrieved for the at least one additional set; and
displaying the output image via the multiscopic display.

Pursuant to the present disclosure, the system and method increase stability of perceived brightness and reduce visible degradation when respective relative positions of eyes of at least one user change. This is achieved by generating an output image using pixel values retrieved for both:
(a) distinct sets of light-emitting cells per multiscopic cell whose emitted light is directed toward the eyes, and
(b) at least one additional set of light-emitting cells per multiscopic cell that is near a single distinct set and sufficiently far from any other distinct set.

By incorporating at least one additional set, the effective emission footprint for each eye is enlarged, extending emission regions into smoother viewing zones. This ensures brightness continuity during natural eye or head motion, including rapid transitions, thereby extending the usable view of the multiscopic rendering. Because additional sets include supporting light-emitting cells around individual distinct sets that contribute to respective eyes' view, small inaccuracies in eye-tracking position estimation do not immediately cause loss of visibility. Even if the eye tracker's estimate drifts, light emitted from the additional set acts as a buffer zone reinforcing the intended eye, so that minor tracker drift or latency does not immediately disrupt visibility.

Moreover, by allocating unused light-emitting cells to additional sets that reinforce one eye's view, the present system and method increase the proportion of active light-emitting cells at each instant of time. This boosts perceived brightness efficiency by converting otherwise unused emission capacity into perceptually relevant reinforcement, thereby increasing efficiency of the array and raising the average luminance available to the user. Furthermore, the enforcement of the first predefined threshold (ensuring closeness to only one distinct set) and the second predefined threshold (ensuring sufficient separation from all others) prevents unintended overlap between sets allocated to different eyes. This minimizes leakage of pixel colours across distinct sets, thereby reducing ghosting and binocular rivalry that would otherwise arise from crosstalk.

By solving the combined problems of narrow emission regions, tracking uncertainty, sudden head motion, crosstalk, and under-utilization, the system and method deliver a robust multiscopic experience. As a result, the user perceives stable brightness, continuous images, and clear interocular separation, with reduced flicker, ghosting, or sudden luminance fluctuations, even under real-world conditions where tracking accuracy fluctuates, environmental lighting changes, or the user makes abrupt movements.

It will be appreciated that the system can be implemented as a heads-up display (HUD) in a vehicle. In some implementations, the multiscopic display may be implemented as a transparent display integrated into a windshield of the vehicle. One example of such a transparent display is described in U.S. patent application Ser. No. 18/818,717, titled "Augmenting Reality with Multiscopic See-through Display", which is incorporated herein by reference. In other implementations, the multiscopic display may be implemented as a non-transparent display used in conjunction with an optical combiner integrated into the windshield. In such implementations, the optical combiner is arranged on an optical path of the non-transparent display and an optical path of a real-world light field from a real-world environment.

It will also be appreciated that the system and the method are not restricted to implementation in an HUD alone. Rather, they may be employed in a variety of other applications, such as digital signage, 3D product demonstrations, or immersive educational and training visualizations, among others.

For illustration purposes only, there will now be described how the aforementioned steps can be performed pursuant to embodiments of the present disclosure.

Identifying Distinct Sets of Light-Emitting Cells:

For a given multiscopic cell of the multiscopic optical element (such as a lenticular lens in a lenticular array, a lenslet in a lenslet array, a transparent portion in a parallax barrier, or any other type of multiscopic cell), distinct sets of light-emitting cells whose emitted light is directed toward respective ones of the eyes of the at least one user, upon passing through the given multiscopic cell, are identified.

This can be implemented in various ways. As an example, for each light-emitting cell underlying the given multiscopic cell, an emission direction of light through the given multiscopic cell is traced, and it is checked whether that light intersects a pupil of a given eye at its tracked position. This ensures that only light-emitting cells that contribute to the perceived image for the given eye are included in the respective set for the given eye.

As another example, to reduce computation, the multiscopic display can be calibrated in advance. For each multiscopic cell and for a range of possible eye positions, a mapping table of contributing light-emitting cells is pre-computed. During operation, a current eye position of the given eye is used to look up a corresponding set of light-emitting cells from the table. Such a calibration may be performed once during manufacture or installation, and reused for subsequent operation.

The result of this step is the plurality of distinct sets: one per eye for the given multiscopic cell. This identification can be repeated for each of the plurality of multiscopic cells, yielding a full mapping of distinct sets for all eyes of the at least one user.

It should be further noted, when identifying distinct sets, that focus spots repeat periodically along the pitch of the multiscopic cells. As a result, the nearest focus spot contributing to a given eye may originate not only from the given multiscopic cell, but also from a neighbouring multiscopic cell (or, at oblique viewing angles, even several multiscopic cells away). This periodicity is accounted for when grouping light-emitting cells into distinct sets, ensuring completeness regardless of which lens they lie beneath.

Determining Additional Set of Light-Emitting Cells:

For the given multiscopic cell, the at least one additional set of light-emitting cells is determined according to proximity and separation rules.

This additional set is:
(i) not a part of any distinct set identified earlier,
(ii) closer to only a single distinct set than to any other distinct set (within the first predefined threshold), and
(iii) farther away from all other distinct sets (beyond the second predefined threshold).

These conditions ensure that the at least one additional set is strongly associated with one eye's view while remaining well-separated from the other eyes' views. Notably, light-emitting cells of the additional set do not directly project light toward any eye at the current tracked positions, but are positioned so that they can reinforce one eye's view without interfering with the other eyes' views.

The determination can proceed as follows:
Proximity analysis: For each unused light-emitting cell beneath the given multiscopic cell, the distance to the nearest distinct set is measured on the array. If the distance is smaller than the first predefined threshold, the light-emitting cell is considered "near" that distinct set.
Exclusion condition: The same light-emitting cell must be farther than the second predefined threshold from every other distinct set, ensuring unambiguous association. In some implementations, the distance (defining separation from other distinct sets) may be measured relative to either a centre of a neighbouring distinct set or to its nearest boundary, thereby flexibly accounting for variations in focus spot size and shape.
Association rule: Each qualifying light-emitting cell is then assigned to the eye corresponding to the nearest distinct set. This eye is referred to as the "given eye" for that additional set.

The first predefined threshold and the second predefined threshold can be expressed relative to the pitch of the light-emitting cells or the pitch of the multiscopic cell, depending on the optical configuration. Measuring distances in these normalized units ensures that the rules scale across different display geometries and resolutions.

By padding the distinct sets with nearby supporting cells (namely, the at least one additional set) in this way, the number of light-emitting cells contributing to the given eye's image is increased. This reinforcement makes the perceived image less sensitive to small shifts in eye position or residual tracking error, while maintaining clear separation between views for different eyes.

This determination can be repeated for each of the plurality of multiscopic cells, yielding a full mapping of additional sets for all eyes of the at least one user.

Generating or Retrieving Images for Eyes:

Images are generated or retrieved for the eyes based on the respective relative positions of the eyes with respect to the image plane. If the multiscopic display is rendering three-dimensional (3D) virtual content, the image for each eye may be generated by rendering a 3D scene from that eye's viewpoint. If the multiscopic display is showing pre-prepared stereo content, the appropriate image for each eye is retrieved from a data repository whereat it was stored previously. The images are aligned to the geometry of the multiscopic display, so that pixel values can be sampled for the correct light-emitting cells.

Retrieving Pixel Values:

For each distinct set of light-emitting cells, pixel values are retrieved from the image associated with the respective eye. For each additional set, the given eye to which it corresponds is identified, and pixel values are retrieved from that eye's image. This ensures that every light-emitting cell in both the distinct sets and the additional sets is assigned a pixel value corresponding to the correct eye's view.

Generating Output Image and Displaying:

The retrieved pixel values are then combined into an output image for display. Each light-emitting cell in the array is assigned the pixel value determined for it, whether it belongs to a distinct set or an additional set. The multiscopic display is then driven with these pixel values at a refresh rate, so that the at least one user perceives a continuous, stable multiscopic image. Because the additional sets are included alongside the distinct sets, the number of light-emitting cells contributing to each eye is increased, which reduces perceptible brightness loss or flicker during head movements or when the eye tracker's estimate is slightly offset, thereby ensuring continuity and stability in the perceived image.

Accordingly, the aforementioned steps collectively enable generation of an output image that incorporates contributions from both distinct sets and additional sets, providing a stable multiscopic display output. It will be appreciated that by repeating these steps across all multiscopic cells, the entirety of the output image can be generated with contributions from both distinct sets and additional sets, resulting in a perceptually stable and robust multiscopic rendering.

In addition to the above steps, further optical configurations may be employed to improve resolution and visual clarity. For example, in some implementations where the multiscopic optical element is a lenticular array, an effective horizontal resolution of the multiscopic display can be increased by allowing multiple light-emitting cells per lenticular lens to contribute to the image for each eye, rather than limiting each viewing direction to a single light-emitting cell. This is achieved by configuring the lenticular lens such that its focal length differs from its physical thickness along the optical axis, as described in U.S. patent application Ser. No. 19/186,827, titled "Autostereoscopic Display with Improved Lenticular Resolution" which is incorporated herein by reference. As a result, light from a given light-emitting cell may exit the curved surface of the lenticular lens at different positions depending on the viewing direction, enabling more efficient use of available light-emitting cells.

This approach relaxes the conventional one-to-one mapping between light-emitting cells and viewing directions. This allows a given direction to receive light from more than one light-emitting cell, and a single light-emitting cell to contribute to a small angular range of directions. Consequently, finer directional control and improved visual clarity can be achieved across a broader range of viewing angles. Additionally, lenses designed with focal lengths different from their thickness can reduce array thickness while maintaining optical performance, supporting compact multiscopic systems.

In such implementations, regions on the curved surface of the lenticular lens through which light from the contributing light-emitting cells passes toward the eye are identified based on optical projection parameters such as focal length and refractive index. Because light may not be uniformly distributed across the curved surface due to aberrations and geometry, these effects can be taken into account when mapping the contributing regions to corresponding pixel locations in the image. Where full ray tracing is not employed, approximations may be used, for example by estimating the distribution of light across the surface as a linear or polynomial function of distance from a focal point.

The corresponding pixel locations in the image are then determined by calculating direction vectors from the contributing cells through the surface regions toward the eye. This ensures that perceived light direction and intensity match the intended rendering while compensating for curvature and viewing geometry.

By ensuring that separate viewing directions, contributing light-emitting cells, and corresponding surface regions are determined for each eye, the output image is generated such that utilised light-emitting cells are primarily visible to only one eye. This improves clarity, enhances depth perception, reduces artefacts, and sustains continuity during user movement. Together, these implementations enable multiscopic displays that combine stable brightness and continuity with improved resolution and compact form factors.

Moreover, optionally, the at least one processor is configured to:
- determine a level of uncertainty in determining the respective relative positions of the eyes; and
- adjust at least one of: the first predefined threshold, the second predefined threshold, based on the level of uncertainty.

In this regard, uncertainty in determining the respective relative positions of the eyes may arise due to one or more of: limitations in the eye tracker accuracy, latency between tracking updates, partial occlusions of the eyes, environmental conditions such as glare and reflections. The level of uncertainty can be estimated using statistical measures (e.g., variance across recent eye position samples), confidence values reported by the eye tracker, predictive error margins from a Kalman filter or similar model, or discrepancies between predicted and actual eye positions during rapid movements.

Based on this level of uncertainty, at least one of: the first predefined threshold, the second predefined threshold may be adjusted. The first predefined threshold governs how close an additional set must be to a distinct set, while the second predefined threshold governs how far it must be from other distinct sets.

For instance, when the level of uncertainty is high, the first predefined threshold can be increased to enlarge a tolerance zone for association with one eye, while the second predefined threshold can be decreased to reinforce separation between sets for different eyes. Conversely, when the level of uncertainty is low, tighter thresholds may be applied for more precise allocation of additional sets. This adaptive adjustment ensures that additional set determination remains stable and exclusive across varying tracking conditions.

Dynamically adapting the thresholds based on the level of uncertainty provides clear technical benefits. First, the system remains robust even when the eye tracker accuracy degrades or fluctuates, since the thresholds are broadened to absorb positional noise without disrupting continuity. Second, narrowing the second predefined threshold during high uncertainty prevents incorrect sharing of additional sets between eyes, avoiding overlap or ghosting. Third, when uncertainty is low, tighter thresholds enable finer spatial control of additional set determination and sharper image fidelity. This helps avoid over-allocation of additional sets and ensures optimal use of available emission regions. Fourth, this adaptive thresholding improves user experience by maintaining stable brightness, minimizing artefacts, and preserving inter-eye separation across a wide range of conditions, including sudden head movements or temporary tracker dropouts. Together, these technical benefits improve the reliability and visual quality of multiscopic rendering under a wide range of tracking conditions.

Furthermore, in an embodiment, when retrieving the pixel values corresponding to the at least one additional set, the at least one processor is configured to replicate pixel values from a subset of the single distinct set as the pixel values corresponding to the at least one additional set, wherein the subset of the single distinct set corresponds to light-emitting cells of the single distinct set that are nearest to the light-emitting cells of the at least one additional set.

The size of the subset of the single distinct set may be chosen to correspond to the number of light-emitting cells in the at least one additional set. As an example, when the number of light-emitting cells in the at least one additional set is N, the subset may include N nearest light-emitting cells from the single distinct set. The pixel values already assigned to these light-emitting cells are then replicated to corresponding light-emitting cells in the additional set, ensuring consistency between the additional set and the subset of the distinct set it reinforces. This spatially nearest-neighbour replication preserves local luminance continuity, so that the additional set effectively extends the distinct set without introducing mismatched brightness or colour artefacts.

As another example, the subset may include a greater number of light-emitting cells. In this case, rather than directly replicating a single pixel value, an averaged value may be computed across the subset. The averaging may be uniform or weighted based on spatial proximity, acting as a perceptual anti-aliasing technique. This reduces blockiness and preserves smooth gradients, particularly in high-resolution panels, while providing a fuller but lower-resolution representation of the original pixel values. By linking the at least one additional set to the nearest portion of the single distinct set in this manner, the additional set effectively extends and reinforces the image intended for the given eye without requiring independent pixel sampling or additional rendering.

This approach of replicating pixel values from a nearest subset of the distinct set to the additional set provides several technical benefits. First, because additional sets use pixel values identical to nearby cells in the distinct set, the visual output appears seamless. This reduces the risk of discontinuities, flickering, or unintended contrast between reinforced regions and primary regions. Second, replication avoids the need to perform new pixel lookups for additional sets. Instead, pixel values already retrieved for the distinct set can be reused, lowering per-frame processing costs and improving real-time performance of the multiscopic rendering pipeline. Third, by tying additional sets directly to their nearest neighbours, the reinforcement remains locally consistent with the intended view of the given eye, even if the user's eye position shifts slightly or if tracker accuracy fluctuates. Fourth, when averaging is applied, the replicated pixel values approximate smooth gradients in the original image, minimising blockiness or step artefacts. This enhances perceived resolution and ensures smoother luminance transitions in regions where the additional set reinforces the distinct set.

In an alternative embodiment, the at least one processor is configured to:
determine, for the given multiscopic cell, an anticipated relative position of the given eye with respect to the image plane, at which light emitted from the at least one additional set of light-emitting cells is likely to be received by the given eye, based on a relative position of the given eye with respect to the image plane as determined using the eye tracker, the position of the given multiscopic cell in the multiscopic optical element, a relative position of the at least one additional set of light-emitting cells with respect to the given multiscopic cell; and
reproject the image to be presented to the given eye from the determined relative position of the given eye to the anticipated relative position of the given eye, prior to retrieving the pixel values corresponding to the at least one additional set.

In this alternative embodiment, the system extends functionality by not only associating the at least one additional set of light-emitting cells with the given eye but also determining where light from these light-emitting cells would actually reach the given eye if its position were to shift. To determine the anticipated relative position, the system models the optical propagation of light through the given multiscopic cell. As an example, ray tracing may be used to trace paths from the additional set through a lenticular lens surface. As another example, a parametric mapping function may be used for computational efficiency. This allows the processor to estimate the anticipated relative position of the given eye at which light from the additional set becomes visible to the given eye.

Once the anticipated relative position is determined, the image intended for the given eye's currently-tracked relative position is reprojected (for example, shifted or warped) to align with the anticipated relative position of the given eye. This reprojection may involve resampling from the image buffer using well-known reprojection techniques, such as affine transforms based on displacement between the current relative position and the anticipated relative position, interpolation of pixel values when the displacement falls between raster grid points, or model-based reprojection using depth information where available.

After reprojection, the pixel values corresponding to the additional set are retrieved from the reprojected image, rather than directly from the image for the currently-tracked relative position. This ensures that although the additional set does not directly project to the given eye at its current relative position, it is correctly aligned with how the image would appear if the given eye shifts into the anticipated relative position.

This reprojection approach provides several technical benefits that directly address stability and robustness in multiscopic displays. First, by preparing pixel values for anticipated eye positions, the system cushions against sudden head movements. This reduces visible dropouts when the user shifts slightly faster than the eye tracker updates. Second, even if eye-tracking data is slightly delayed, the reprojection aligns additional set contributions to where the eye is likely to be, maintaining image continuity despite latency. Third, instead of relying only on the instantaneous tracked position, reprojection leverages optical geometry to create a predictive buffer, absorbing residual noise and latency in tracking estimates. Fourth, by aligning pixel values with the anticipated relative position, reprojection ensures that reinforced emission from the additional sets does not introduce parallax errors or misaligned stereo cues. The combined effect is smoother transitions, fewer flickering artefacts, and more robust brightness continuity, especially in real-world use cases with abrupt user motion, partial occlusion of the eyes, or imperfect tracker response. By projecting ahead to anticipated eye positions, the system effectively broadens the usable emission footprint of each multiscopic cell, mitigating the problem of narrow effective emission regions while maintaining temporal stability across tracking updates.

Moreover, optionally, the at least one processor is configured to adjust a luminance of the pixel values retrieved for the at least one additional set based on a distance between the at least one additional set and the single distinct set.

In this regard, the distance between each light-emitting cell in the additional set and its nearest neighbour(s) in the corresponding distinct set can be calculated. The distance may be expressed in terms of the pitch of the light-emitting cells, or an angular displacement of projected rays after passing through the given multiscopic cell.

The luminance of the pixel values can be adjusted by applying a luminance adjustment function to scale the pixel values retrieved for the additional set. The luminance adjustment function may be linear (having proportional falloff with distance), non-linear (e.g., exponential, for sharper attenuation at greater distances), or piecewise (constant luminance within a tolerance band and gradual falloff beyond a predefined threshold distance). Linear functions offer predictable and efficient scaling, exponential functions suppress interference more aggressively, and piecewise functions balance robustness with visual smoothness.

In implementations where pixel values of the given image are replicated for the additional set, the pixel values can be scaled in intensity according to distance-based weighting. For example, if an additional light-emitting cell is directly adjacent to the distinct set, its luminance may be left unmodified. If the additional light-emitting cell is two or three cell pitches away, its luminance may be scaled down by 20-40% depending on the applied function.

Precomputed scaling tables can be used to speed up runtime operations. These tables store luminance multipliers for various distances and display geometries. On the other hand, dynamic computation can be applied in case of variable eye-tracking confidence, allowing scaling factors to adapt in real-time to varying tracker confidence or viewing geometry.

This luminance adjustment provides several important technical benefits for multiscopic rendering. From an image quality perspective, distance-based luminance scaling prevents localized brightness spikes, maintains smooth luminance gradients, and preserves binocular balance critical for depth perception. From a temporal stability perspective, gradual tapering ensures that transitions as additional sets shift in or out of use appear smooth, preventing sudden brightness jumps or flicker during natural eye or head motion. From a system efficiency perspective, reducing luminance contributions from distant additional light-emitting cells avoids unnecessary power expenditure, which is particularly valuable for power-constrained or portable devices.

Furthermore, optionally, when identifying the plurality of distinct sets, the at least one processor is configured to:
  for the given multiscopic cell, identify respective focus spots on the array of light-emitting cells for the eyes of the at least one user, based on the respective relative positions of the eyes with respect to the image plane and the position of the given multiscopic cell in the multiscopic optical element; and
  identify respective ones of the plurality of distinct sets for the respective focus spots based on optical projection parameters of the given multiscopic cell.

The focus spots act as optically-defined convergence regions on the array of light-emitting cells, serving as anchor points for determining the distinct sets corresponding to each eye. For the given multiscopic cell, a geometric relationship is established between the tracked relative position of the eye with respect to the image plane and the position of the multiscopic cell. Using this geometric relationship, a focus spot is identified as an optically-defined convergence region (which may be approximated as a point or a cluster) on the array where a gaze vector from the given eye converges after passing through the given multiscopic cell. As an example, the focus spot can be identified by tracing back rays from the pupil of the eye through the given multiscopic cell to intersect the array. As another example, the focus spot can be identified using the optical projection parameters of the given multiscopic cell to compute an effective mapping from the eye position to array coordinates.

Once the focus spot for a given eye is identified, neighbouring light-emitting cells whose emissions overlap with the focus spot's convergence region are grouped together. This grouping defines the distinct set for that eye, ensuring that only those light-emitting cells whose rays contribute meaningfully to the perceived image are included. The size and shape of the distinct set depend on the optical projection parameters of the given multiscopic cell, including at least one of: an aperture size, a focal length, a thickness, a curvature, a refractive index, an angular acceptance range of rays reaching the eye.

For efficiency, the mapping between the relative eye positions and the focus spot locations may be precomputed and stored in a lookup table or a parametric model. During operation, the current relative position of the eye is used to select or interpolate between precomputed focus spot mappings, ensuring smooth updates without requiring full optical recalculation at runtime.

This focus-spot-based approach offers several technical benefits. From an image fidelity perspective, it ensures accurate light-emitting cell assignment, reducing crosstalk and preserving binocular disparity. From a stability perspective, the smooth shifting of focus spots prevents flicker as the eye moves across viewing zones. From a robustness perspective, the approach naturally accommodates optical imperfections and real-world lens tolerances. From an applicability perspective, it can be applied uniformly across lenticular arrays, lenslet arrays, parallax barriers and other types of multiscopic optical elements, as long as their optical projection parameters are known. This broad applicability makes it suitable for multiple product lines (e.g., HUDs, multiscopic monitors, or similar).

Moreover, optionally, when determining a given additional set of light-emitting cells for a given multiscopic cell, the at least one processor is configured to:
  determine when the given additional set is separated by a first distance and a second distance, each smaller than the first predefined threshold, from a first distinct set of light-emitting cells and a second distinct set of light-emitting cells, respectively, wherein the first distinct set and the second distinct set correspond to a first eye and a second eye of an individual one of the at least one user; and
  when it is determined that the given additional set is separated by the first distance and the second distance, each smaller than the first predefined threshold, from the first distinct set and the second distinct set, respectively,
    determine which one of the first eye and the second eye is a dominant eye of the individual one of the at least one user; and
    select the given additional set for retrieving pixel values to be presented to the dominant eye.

When a given additional set is nearly equidistant from distinct sets corresponding to both eyes of the same user, an ambiguous assignment arises because the additional set satisfies the proximity condition for both eyes. To resolve such ambiguity, it can be determined which eye of the user is the dominant eye. The dominant eye may be established:

- using the eye tracker itself, for example by detecting which eye maintains fixation stability during calibration or runtime,
- via a dedicated calibration procedure (such as a sight alignment test), or
- through pre-stored information supplied by an optometrist or user profile in a data repository.

Once the dominant eye is determined, the given additional set is linked exclusively to the distinct set corresponding to the dominant eye, and pixel values for the additional set are retrieved from the image for the dominant eye.

Such a dominant-eye-selective assignment of the additional set has several technical benefits. First, it ensures that additional sets equidistant to distinct sets for both eyes are neither duplicated nor left undefined. Only one eye is assigned the ambiguous additional set, avoiding double allocation that could create binocular rivalry or ghosting. Second, it prevents conflicting assignments that could lead to crosstalk or unstable binocular rendering. Third, by biasing reinforcement toward the dominant eye, the system aligns with the eye that has greater perceptual influence. Fourth, since the dominant eye typically drives binocular fusion, reinforcing its view minimizes perceptual conflict and supports comfortable depth perception even under ambiguous geometry. Fifth, dominance-based disambiguation is user-specific and adaptable. Whether dominance is detected once (during calibration) or dynamically (via the eye tracker), the system ensures robust allocation under variable tracking accuracy, eye occlusions, or fast head motion.

For illustration purposes, there will now be described how various components of the system can be implemented. The at least one processor of the system controls an overall operation of the system, and is communicably coupled to the eye tracker and the multiscopic display. Optionally, the at least one processor is implemented as a processor of the multiscopic display. Alternatively, optionally, the at least one processor of the system is implemented as a processor of a computing device that is communicably coupled to the multiscopic display. Examples of the computing device include, but are not limited to, a laptop, a desktop, a tablet, a phablet, a personal digital assistant, a workstation, and a console. Additionally or alternatively, optionally, the at least one processor of the system is implemented at least partially as a cloud server (namely, a remote server) that provides a cloud computing service.

Throughout the present disclosure, the term "eye tracker" refers to specialised equipment for detecting and/or following a position of eyes of a given user. The given user encompasses each individual one of the at least one user; notably, the at least one user can be a single user or a plurality of users. Optionally, the eye tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the eye tracker. When different types of images captured by the various different types of tracking cameras are utilised, a position of the user's eyes can be determined highly accurately, as results obtained from one type of image can be used to refine results obtained from another type of image. Herein, these different types of images constitute tracking data collected by the eye tracker, and may be in the form of at least one of: visible-light images, IR images, depth images. It will be appreciated that the eye tracker tracks the eyes of the given user with a significantly high accuracy and precision, such that an error in determining the relative position may, for example, be minimised to within a tolerance range of approximately (+/−) 8 millimetres.

The respective images to be presented to the eyes of the at least one user are generated or retrieved based on the respective relative positions of the eyes with respect to the image plane. In some implementations, the at least one processor is configured to generate the respective images by employing a 3D model of at least one virtual object. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at the data repository that is communicably coupled to the at least one processor. The data repository may be implemented as a memory of the at least one processor, a cloud-based database, or similar. In other implementations, the at least one processor is configured to retrieve the images in a form of 2D user interface (UI) elements. A 2D UI element could pertain to, for example, a virtual navigation tool, a virtual gadget, a virtual message, a virtual entity, a virtual entertainment media, a virtual information, or similar.

Notably, the same output image is displayed for different eyes of the at least one user. This output image is conceptually similar to a conventional light field image, with the distinction that a greater number of light-emitting cells are employed per multiscopic cell to present high-resolution virtual content to the different eyes of the at least one user. Light field images, which represent view-dependent image information across multiple angular directions, are well known in the art.

Pursuant to embodiments of the present disclosure, different types of multiscopic displays can be implemented. For example, the multiscopic display can be any one of: hogel-based, lenticular array-based, lenslet array-based, parallax barrier-based. Depending on the type of the multiscopic display, the multiscopic optical element can be a hogel array, a lenticular array, a lenslet array, a parallax barrier, or similar. The term "multiscopic cell" encompasses a hogel in a hogel array, a lenticular lens in a lenticular array, a lenslet in a lenslet array, and a transparent portion in a parallax barrier.

The term "light-emitting element" as used herein refers to any individually controllable emitter in the multiscopic display, including pixels, subpixels, or other display sampling units (such as emissive samples in a multisampling configuration). Embodiments of the present disclosure can be employed in multiscopic displays that include subpixel arrangements (such as RGB stripe or delta layouts), as well as displays without subpixels, such as monochrome displays or those using time-sequential colour (e.g., colour wheel backlit systems).

The image plane of the multiscopic display can be a light-emitting surface of the multiscopic display or an imaginary plane that is parallel to the light-emitting surface, in a case where the multiscopic display is being directly viewed. Alternatively, the image plane can be an imaginary plane in another case where an optical combiner is employed to facilitate a reflected view. The term "image plane" refers to an intended location in space where the graphical element is perceived. This does not require the multiscopic display or other optical elements on the optical path to be physically planar. This definition applies irrespective of the optical configuration of the system, namely:
  (i) in a case where a distorted image is displayed on a curved or non-curved display and reflected through a curved combiner,
  (ii) in a case where an undistorted image is displayed on a non-curved display and reflected through a non-curved combiner,
  (iii) in a case where an image is displayed on the multiscopic display and viewed directly (without any optical combiner).

The present disclosure also relates to the method as described above. Various embodiments and variants disclosed above, with respect to the aforementioned first aspect, apply mutatis mutandis to the method.

Optionally, the method further comprises:
  determining a level of uncertainty in determining the respective relative positions of the eyes; and
  adjusting at least one of: the first predefined threshold, the second predefined threshold, based on the level of uncertainty.

By adjusting the first predefined threshold and the second predefined threshold based on the level of uncertainty in determining the relative eye positions, the method maintains stable allocation of additional sets even when tracking accuracy fluctuates. This prevents overlap or ghosting under noisy tracking conditions while enabling tighter allocation and sharper image fidelity when confidence is high. As a result, the method provides reliable visual continuity and improved interocular separation across varying tracking conditions.

In an embodiment, retrieving the pixel values corresponding to the at least one additional set comprises replicating pixel values from a subset of the single distinct set as the pixel values corresponding to the at least one additional set, wherein the subset of the single distinct set corresponds to light-emitting cells of the single distinct set that are nearest to the light-emitting cells of the at least one additional set. By replicating pixel values from the nearest subset of the single distinct set, the method ensures seamless reinforcement of the additional set without introducing mismatched brightness or colour. This reduces processing overhead by reusing existing pixel lookups, while preserving local luminance continuity and smooth gradients. As a result, the method improves visual stability, minimizes artefacts, and maintains perceptual consistency under varying eye movements or tracker accuracy.

In an alternative embodiment, the method further comprises:
  determining, for the given multiscopic cell, an anticipated relative position of the given eye with respect to the image plane, at which light emitted from the at least one additional set of light-emitting cells is likely to be received by the given eye, based on a relative position of the given eye with respect to the image plane as determined using the eye tracker, the position of the given multiscopic cell in the multiscopic optical element, a relative position of the at least one additional set of light-emitting cells with respect to the given multiscopic cell; and
  reprojecting the image to be presented to the given eye from the determined relative position of the given eye to the anticipated relative position of the given eye, prior to retrieving the pixel values corresponding to the at least one additional set.

By reprojecting the image to the anticipated eye position, the method cushions against sudden head movements and tracking latency, broadening the usable emission footprint of each multiscopic cell. This predictive alignment reduces flicker and dropouts while maintaining temporal stability and accurate stereo cues.

Moreover, optionally, the method further comprises adjusting a luminance of the pixel values retrieved for the at least one additional set based on a distance between the at least one additional set and the single distinct set. By adjusting the luminance of the pixel values retrieved for the additional set according to distance from the single distinct set, the method prevents localized brightness spikes and preserves smooth luminance gradients. This tapering stabilizes binocular balance during motion, minimizes flicker, and reduces power expenditure by avoiding unnecessary emission from distant light-emitting cells.

Furthermore, optionally, identifying the plurality of distinct sets comprises:
  for the given multiscopic cell, identifying respective focus spots on the array of light-emitting cells for the eyes of the at least one user, based on the respective relative positions of the eyes with respect to the image plane and the position of the given multiscopic cell in the multiscopic optical element; and
  identifying respective ones of the plurality of distinct sets for the respective focus spots based on optical projection parameters of the given multiscopic cell.

By identifying focus spots and grouping light-emitting cells based on the optical projection parameters of the given multiscopic cell, the method ensures accurate assignment of light-emitting cells to each eye, reducing crosstalk and preserving binocular disparity. As the focus spots shift smoothly with eye movement, flicker is minimized, and robustness to lens imperfections is improved, supporting stable and comfortable depth perception across different multiscopic optical elements.

Moreover, optionally, determining a given additional set of light-emitting cells for a given multiscopic cell comprises:
determining when the given additional set is separated by a first distance and a second distance, each smaller than the first predefined threshold, from a first distinct set of light-emitting cells and a second distinct set of light-emitting cells, respectively, wherein the first distinct set and the second distinct set correspond to a first eye and a second eye of an individual one of the at least one user; and
when it is determined that the given additional set is separated by the first distance and the second distance, each smaller than the first predefined threshold, from the first distinct set and the second distinct set, respectively,
determining which one of the first eye and the second eye is a dominant eye of the individual one of the at least one user; and
selecting the given additional set for retrieving pixel values to be presented to the dominant eye.

By assigning ambiguous additional sets to the dominant eye, the method avoids duplication or undefined allocation, preventing crosstalk and binocular rivalry. Reinforcing the dominant eye ensures stable binocular fusion and minimizes perceptual conflict, while adapting to user-specific dominance supports comfortable depth perception under variable tracking accuracy and motion.

DETAILED DESCRIPTION OF THE DRAWINGS

Figure 1B:
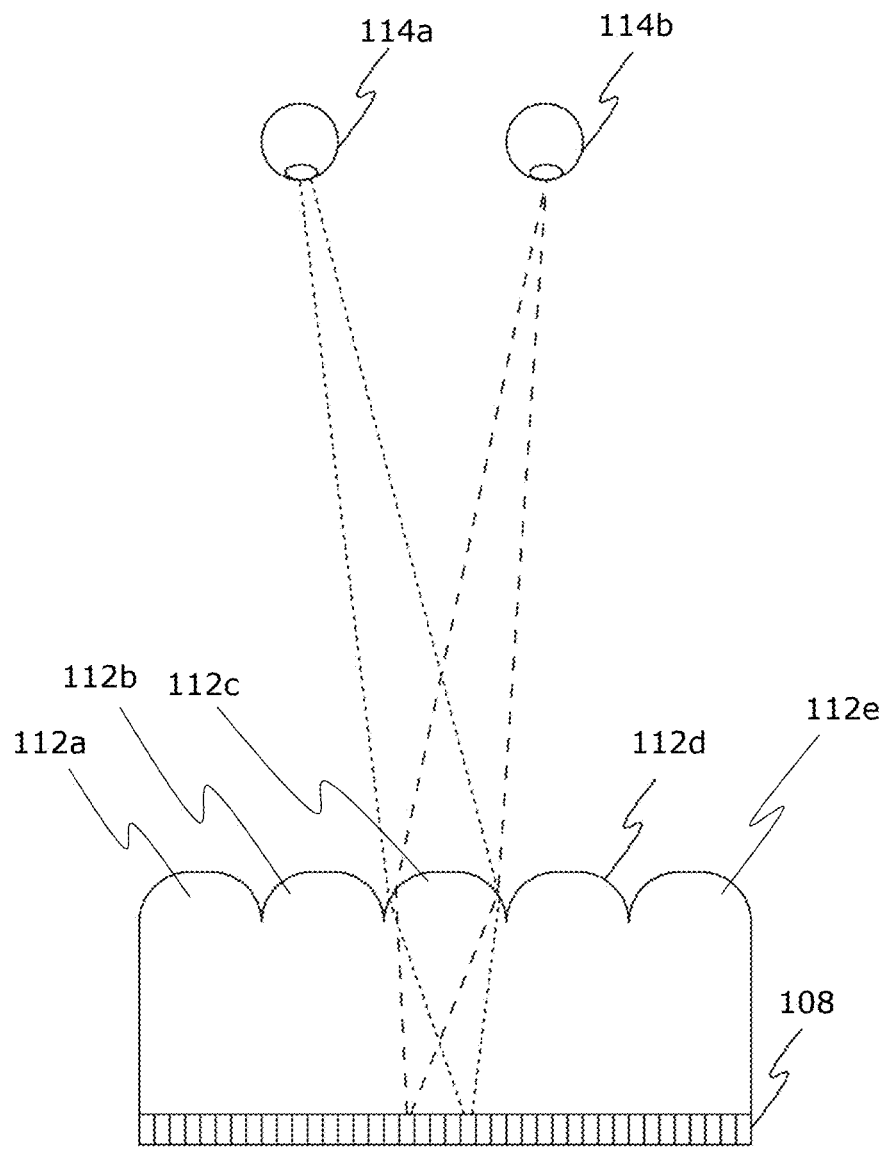
Figure 1C:
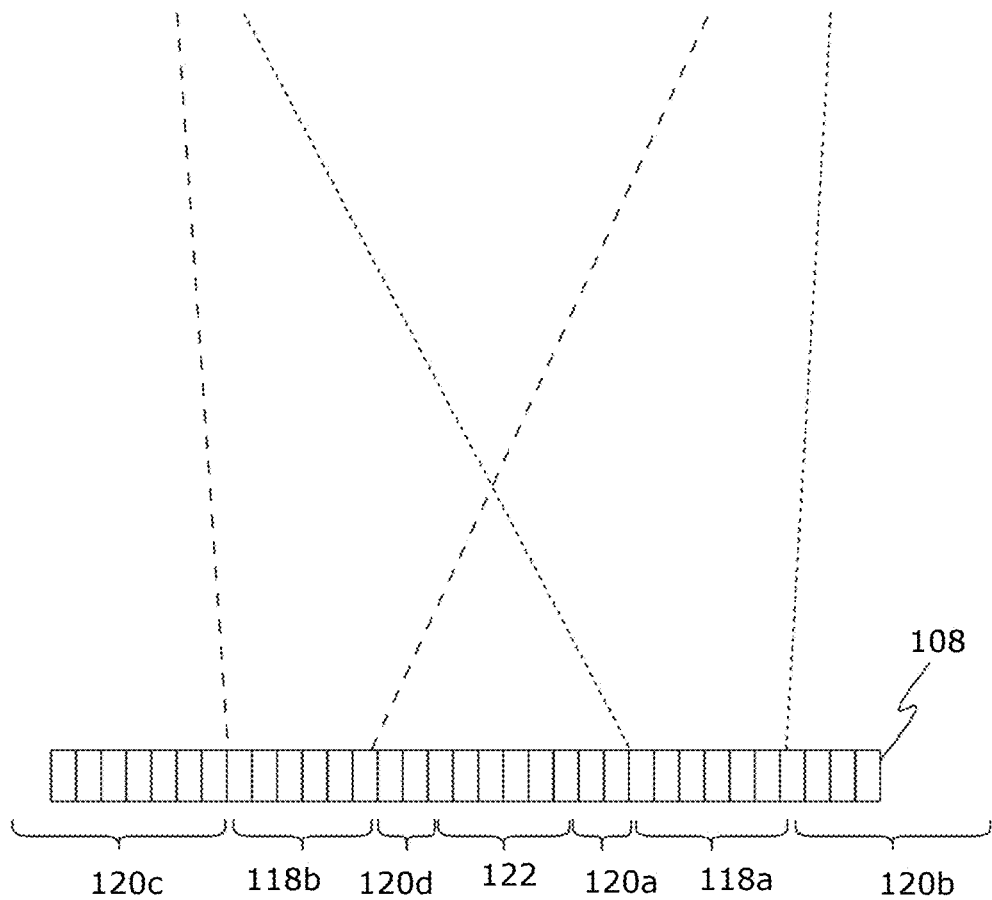
FIG. 1C depicts a further zoomed-in part of the cross-section of the multiscopic display, in accordance with an embodiment of the present disclosure.

FIG. 1A is a schematic illustration of a system 100 for extending a view of a multiscopic rendering; FIG. 1B depicts a zoomed-in part of a cross-section of a multiscopic display 102, while FIG. 1C depicts a further zoomed-in part of the cross-section of the multiscopic display 102, in accordance with an embodiment of the present disclosure. Apart from the multiscopic display 102, the system 100 comprises an eye tracker 104 and at least one processor, depicted as a processor 106. The multiscopic display 102 comprises an array 108 of light-emitting cells and a multiscopic optical element 110 comprising a plurality of multiscopic cells. Some of these multiscopic cells are depicted as multiscopic cells 112a-112e in the zoomed-in part of the cross-section of the multiscopic display 102 in FIG. 1B. The cross-section is cut along an X-axis of multiscopic display 102, and shows respective widths of the multiscopic cells 112a-112e along the X-axis.

The processor 106 is configured to:
determine respective relative positions of eyes 114a-114b of at least one user with respect to an image plane 116 of the multiscopic display 102, using the eye tracker;
for a given multiscopic cell 112c, identify a plurality of distinct sets 118a-118b of light-emitting cells whose emitted light is directed toward respective ones of the eyes 114a-114b of the at least one user, based on the respective relative positions of the eyes 114a-114b with respect to the image plane 116, and a position of the given multiscopic cell 112c in the multiscopic optical element 110;
for the given multiscopic cell 112c, determine at least one additional set (depicted as additional sets 120a-120b, 120c-120d) of light-emitting cells that:
(i) does not emit light that is directed toward any of the eyes 114a-114b of the at least one user,
(ii) is separated by a distance smaller than a first predefined threshold from a single distinct set 118a (for the additional sets 120a-120b) and 118b (for the additional sets 120c-120d), and
(iii) is separated by a distance greater than a second predefined threshold from any other distinct set of light-emitting cells;
generate or retrieve respective images to be presented to the eyes 114a-114b of the at least one user, based on the respective relative positions of the eyes 114a-114b with respect to the image plane 116;
retrieve pixel values, from each of the respective images, corresponding to a respective one of the plurality of distinct sets 118a-118b;
identify a given eye 114a-114b corresponding to the single distinct set 118a-118b;
retrieve pixel values, from an image to be presented to the given eye 114a-114b, corresponding to the at least one additional set 120a-120b and 120c-120d;
generate an output image using pixel values retrieved for the plurality of distinct sets 118a-118b and the pixel values retrieved for the at least one additional set 120a-120b and 120c-120d; and
display the output image via the multiscopic display 102.

As shown in FIG. 1C, the additional sets 120a-120b correspond to the eye 114a, as it corresponds to the distinct set 118a. The additional sets 120c-120d correspond to the eye 114b, as it corresponds to the distinct set 118b. With reference to FIG. 1C, a safe zone 122, lying between the additional sets 120a and 120d, is left unutilised. This safe zone 122 allows for a separation greater than the second predefined threshold.

It may be understood by a person skilled in the art that FIGS. 1A-1C include simplified example implementations of the system 100 and how it works, for sake of clarity, which should not unduly limit the scope of the claims herein. It is to be understood that the specific implementation of the system 100 is not to be construed as limiting it to specific numbers or types of eye trackers, multiscopic displays, processors, array of light-emitting cells and multiscopic optical elements. The person skilled in the art will recognize many variations, alternatives, and modifications of embodiments of the present disclosure.

Figure 2:
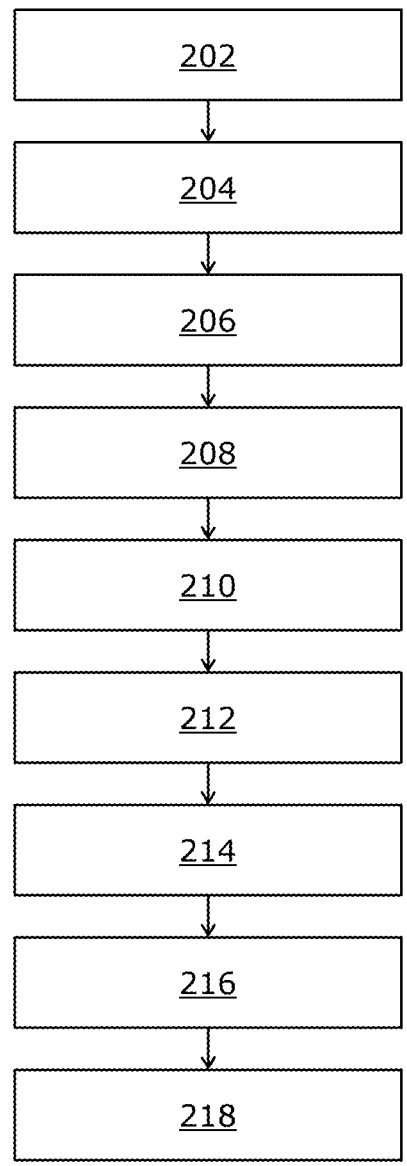
FIG. 2 depicts steps of a method for extending a view of a multiscopic rendering, in accordance with an embodiment of the present disclosure.

Referring to FIG. 2, illustrated are steps of a method for extending a view of a multiscopic rendering, in accordance with an embodiment of the present disclosure. At step 202, respective relative positions of eyes of at least one user with respect to an image plane of the multiscopic display are determined, using the eye tracker. At step 204, for a given multiscopic cell, a plurality of distinct sets of light-emitting cells whose emitted light is directed toward respective ones of the eyes of the at least one user are identified, based on the respective relative positions of the eyes with respect to the image plane, and a position of the given multiscopic cell in the multiscopic optical element. At step 206, for the given multiscopic cell, at least one additional set of light-emitting cells, which: (i) does not emit light that is directed toward any of the eyes of the at least one user, (ii) is separated by a distance smaller than a first predefined threshold from a single distinct set of light-emitting cells, and (iii) is separated by a distance greater than a second predefined threshold from any other distinct set of light-emitting cells, is determined. At step 208, respective images to be presented to the eyes of the at least one user are generated or retrieved, based on the respective relative positions of the eyes with respect to the image plane. At step 210, pixel values corresponding to a respective one of the plurality of distinct sets are retrieved from each of the respective images. At step 212, a given eye corresponding to the single distinct set is identified. At step 214, pixel values corresponding to the at least one additional set are retrieved from an image to be presented to the given eye. At step 216, an output image is generated using pixel values retrieved for the plurality of distinct sets and the pixel values retrieved for the at least one additional set. At step 218, the output image is displayed via the multiscopic display.

The aforementioned steps are only illustrative and other alternatives can also be provided where one or more steps are added, without departing from the scope of the claims herein.

The invention claimed is:

1. A system comprising:
   an eye tracker;
   a multiscopic display comprising:
      an array of light-emitting cells; and
      a multiscopic optical element comprising a plurality of multiscopic cells; and
   at least one processor configured to:
      determine respective relative positions of eyes of at least one user with respect to an image plane of the multiscopic display, using the eye tracker;
      for a given multiscopic cell, identify a plurality of distinct sets of light-emitting cells whose emitted light is directed toward respective ones of the eyes of the at least one user, based on the respective relative positions of the eyes with respect to the image plane, and a position of the given multiscopic cell in the multiscopic optical element;
      for the given multiscopic cell, determine at least one additional set of light-emitting cells that:
         (i) does not emit light that is directed toward any of the eyes of the at least one user,
         (ii) is separated by a distance smaller than a first predefined threshold from a single distinct set of light-emitting cells, and
         (iii) is separated by a distance greater than a second predefined threshold from any other distinct set of light-emitting cells;
      generate or retrieve respective images to be presented to the eyes of the at least one user, based on the respective relative positions of the eyes with respect to the image plane;
      retrieve pixel values, from each of the respective images, corresponding to a respective one of the plurality of distinct sets;
      identify a given eye corresponding to the single distinct set;
      retrieve pixel values, from an image to be presented to the given eye, corresponding to the at least one additional set;
      generate an output image using pixel values retrieved for the plurality of distinct sets and the pixel values retrieved for the at least one additional set; and
      display the output image via the multiscopic display.

2. The system of claim 1, wherein the at least one processor is configured to:
   determine a level of uncertainty in determining the respective relative positions of the eyes; and
   adjust at least one of: the first predefined threshold, the second predefined threshold, based on the level of uncertainty.

3. The system of claim 1, wherein when retrieving the pixel values corresponding to the at least one additional set, the at least one processor is configured to replicate pixel values from a subset of the single distinct set as the pixel values corresponding to the at least one additional set, wherein the subset of the single distinct set corresponds to light-emitting cells of the single distinct set that are nearest to the light-emitting cells of the at least one additional set.

4. The system of claim 1, wherein the at least one processor is configured to:
   determine, for the given multiscopic cell, an anticipated relative position of the given eye with respect to the image plane, at which light emitted from the at least one additional set of light-emitting cells is likely to be received by the given eye, based on a relative position of the given eye with respect to the image plane as determined using the eye tracker, the position of the given multiscopic cell in the multiscopic optical element, a relative position of the at least one additional set of light-emitting cells with respect to the given multiscopic cell; and
   reproject the image to be presented to the given eye from the determined relative position of the given eye to the anticipated relative position of the given eye, prior to retrieving the pixel values corresponding to the at least one additional set.

5. The system of claim 1, wherein the at least one processor is configured to adjust a luminance of the pixel values retrieved for the at least one additional set based on a distance between the at least one additional set and the single distinct set.

6. The system of claim 1, wherein when identifying the plurality of distinct sets, the at least one processor is configured to:
   for the given multiscopic cell, identify respective focus spots on the array of light-emitting cells for the eyes of the at least one user, based on the respective relative positions of the eyes with respect to the image plane and the position of the given multiscopic cell in the multiscopic optical element; and
   identify respective ones of the plurality of distinct sets for the respective focus spots based on optical projection parameters of the given multiscopic cell.

7. The system of claim 1, wherein when determining a given additional set of light-emitting cells for a given multiscopic cell, the at least one processor is configured to:
   determine when the given additional set is separated by a first distance and a second distance, each smaller than the first predefined threshold, from a first distinct set of light-emitting cells and a second distinct set of light-emitting cells, respectively, wherein the first distinct set and the second distinct set correspond to a first eye and a second eye of an individual one of the at least one user; and
   when it is determined that the given additional set is separated by the first distance and the second distance, each smaller than the first predefined threshold, from the first distinct set and the second distinct set, respectively,
      determine which one of the first eye and the second eye is a dominant eye of the individual one of the at least one user; and
      select the given additional set for retrieving pixel values to be presented to the dominant eye.

8. A method comprising:
   determining respective relative positions of eyes of at least one user with respect to an image plane of a multiscopic display, using an eye tracker, wherein the multiscopic display comprises an array of light-emitting cells and a multiscopic optical element comprising a plurality of multiscopic cells;

for a given multiscopic cell, identifying a plurality of distinct sets of light-emitting cells whose emitted light is directed toward respective ones of the eyes of the at least one user, based on the respective relative positions of the eyes with respect to the image plane, and a position of the given multiscopic cell in the multiscopic optical element;

for the given multiscopic cell, determining at least one additional set of light-emitting cells that:
  (i) does not emit light that is directed toward any of the eyes of the at least one user,
  (ii) is separated by a distance smaller than a first predefined threshold from a single distinct set of light-emitting cells, and
  (iii) is separated by a distance greater than a second predefined threshold from any other distinct set of light-emitting cells;

generating or retrieving respective images to be presented to the eyes of the at least one user, based on the respective relative positions of the eyes with respect to the image plane;

retrieving pixel values, from each of the respective images, corresponding to a respective one of the plurality of distinct sets;

identifying a given eye corresponding to the single distinct set;

retrieving pixel values, from an image to be presented to the given eye, corresponding to the at least one additional set;

generating an output image using pixel values retrieved for the plurality of distinct sets and the pixel values retrieved for the at least one additional set; and displaying the output image via the multiscopic display.

9. The method of claim 8, further comprising:
determining a level of uncertainty in determining the respective relative positions of the eyes; and
adjusting at least one of: the first predefined threshold, the second predefined threshold, based on the level of uncertainty.

10. The method of claim 8, wherein retrieving the pixel values corresponding to the at least one additional set comprises replicating pixel values from a subset of the single distinct set as the pixel values corresponding to the at least one additional set, wherein the subset of the single distinct set corresponds to light-emitting cells of the single distinct set that are nearest to the light-emitting cells of the at least one additional set.

11. The method of claim 8, further comprising:
determining, for the given multiscopic cell, an anticipated relative position of the given eye with respect to the image plane, at which light emitted from the at least one additional set of light-emitting cells is likely to be received by the given eye, based on a relative position of the given eye with respect to the image plane as determined using the eye tracker, the position of the given multiscopic cell in the multiscopic optical element, a relative position of the at least one additional set of light-emitting cells with respect to the given multiscopic cell; and
reprojecting the image to be presented to the given eye from the determined relative position of the given eye to the anticipated relative position of the given eye, prior to retrieving the pixel values corresponding to the at least one additional set.

12. The method of claim 8, further comprising adjusting a luminance of the pixel values retrieved for the at least one additional set based on a distance between the at least one additional set and the single distinct set.

13. The method of claim 8, wherein identifying the plurality of distinct sets comprises:
for the given multiscopic cell, identifying respective focus spots on the array of light-emitting cells for the eyes of the at least one user, based on the respective relative positions of the eyes with respect to the image plane and the position of the given multiscopic cell in the multiscopic optical element; and
identifying respective ones of the plurality of distinct sets for the respective focus spots based on optical projection parameters of the given multiscopic cell.

14. The method of claim 8, wherein determining a given additional set of light-emitting cells for a given multiscopic cell comprises:
determining when the given additional set is separated by a first distance and a second distance, each smaller than the first predefined threshold, from a first distinct set of light-emitting cells and a second distinct set of light-emitting cells, respectively, wherein the first distinct set and the second distinct set correspond to a first eye and a second eye of an individual one of the at least one user; and
when it is determined that the given additional set is separated by the first distance and the second distance, each smaller than the first predefined threshold, from the first distinct set and the second distinct set, respectively,
determining which one of the first eye and the second eye is a dominant eye of the individual one of the at least one user; and
selecting the given additional set for retrieving pixel values to be presented to the dominant eye.

* * * * *